(12) United States Patent
Albers et al.

(10) Patent No.: US 10,990,086 B2
(45) Date of Patent: Apr. 27, 2021

(54) MODULE FOR A TECHNICAL FACILITY AND METHOD FOR CONTROLLING A TECHNICAL FACILITY

(71) Applicant: WAGO Verwaltungsgesellschaft mbH, Minden (DE)

(72) Inventors: Thomas Albers, Minden (DE); Thomas Holm, Bremen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/072,925

(22) PCT Filed: Jan. 25, 2017

(86) PCT No.: PCT/EP2017/051520
§ 371 (c)(1),
(2) Date: Jul. 26, 2018

(87) PCT Pub. No.: WO2017/129606
PCT Pub. Date: Aug. 3, 2017

(65) Prior Publication Data
US 2019/0041831 A1 Feb. 7, 2019

(30) Foreign Application Priority Data
Jan. 26, 2016 (DE) .................... 10 2016 201 077.8

(51) Int. Cl.
*G05B 19/418* (2006.01)
*G05B 19/042* (2006.01)

(52) U.S. Cl.
CPC ..... *G05B 19/41845* (2013.01); *G05B 19/042* (2013.01); *G05B 19/418* (2013.01);
(Continued)

(58) Field of Classification Search
CPC .......... G05B 19/41845; G05B 19/4183; G05B 19/4185
(Continued)

(56) References Cited

U.S. PATENT DOCUMENTS

| 2007/0010898 | A1* | 1/2007 | Hosek | ................ | G05B 19/4185 700/2 |
| 2013/0212420 | A1* | 8/2013 | Lawson | ............. | G05B 19/4185 713/400 |

(Continued)

OTHER PUBLICATIONS

Wikipedia—OPC Unified Architecture, Revision History Jan. 21, 2016; Wikimedia Foundation, retrieved from https://en.wikipedia.org/w/index.php?title=OPC_Unified_Architecture&oldid=700910593 on Sep. 29, 2019 (Year: 2016).*
(Continued)

*Primary Examiner* — Mohammad Ali
*Assistant Examiner* — Joshua T Sanders
(74) *Attorney, Agent, or Firm* — Muncy, Geissler, Olds & Lowe, P.C.

(57) ABSTRACT

The invention relates to a module for a technical facility comprising a technical hardware for executing a technical sub-process, a controller for locally controlling the technical hardware wherein the controller is configured to control the technical hardware automatically and an external interface of the controller, wherein the external interface comprises an OPC-UA server. The OPC-UA server has a fixedly predetermined information structure having static information and dynamic information wherein the static information describes the technical hardware and the controller, and the controller writes the dynamic information as real-time values of the technical hardware into the information structure. Furthermore, a corresponding method for controlling a technical facility is claimed.

19 Claims, 5 Drawing Sheets

Figure 1:
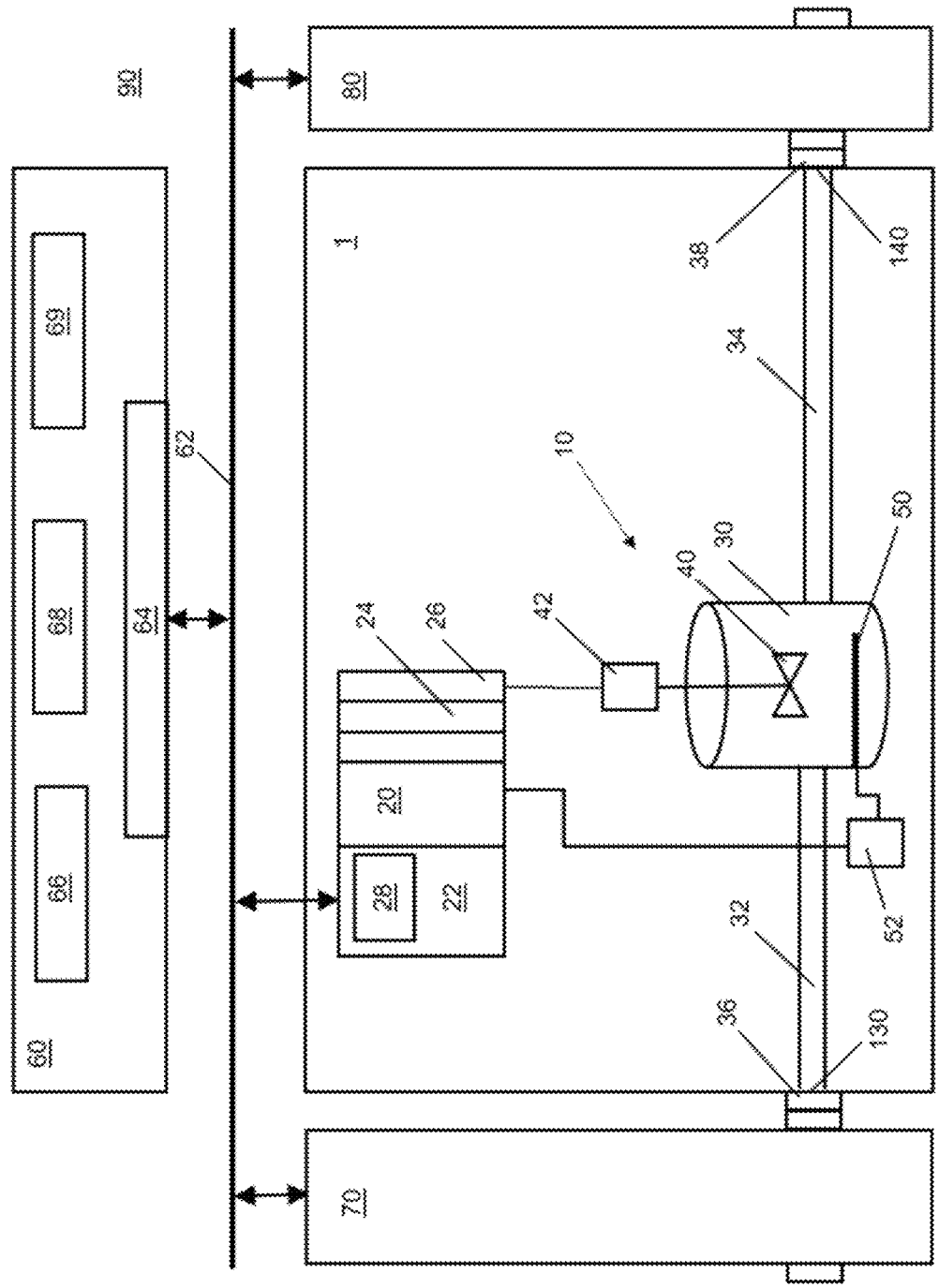

(52) U.S. Cl.
CPC ..... *G05B 19/4183* (2013.01); *G05B 19/4185* (2013.01); *G05B 19/41885* (2013.01); *Y02P 90/02* (2015.11)

(58) Field of Classification Search
USPC .......................................................... 700/97
See application file for complete search history.

(56) References Cited

U.S. PATENT DOCUMENTS

2014/0364970 A1* 12/2014 Goli .................... G05B 19/042
700/87
2018/0088541 A1* 3/2018 Sangi ..................... F22B 35/18

OTHER PUBLICATIONS

Wago: "DIMA—Dezentrale Intelligenz für modulare Anlagen", Dec. 14, 2015, pp. 1-8, XP55355696, Retrieved from the Internet: URL:http://www.dima-process.com/wp-content/uploads/2015/12/WHITEPAPER_Technische_Loesung_ fuer - die Automatisierung_ modularer_An lagen.pdf.
Wago: DIMA Mar. 20, 2017, pp. 1-1, XP055356602, Retrieved from the Internet: URL:http://www.dima-process.com/.
International Search Report and Written Opinion dated Mar. 31, 2017 in International Application No. PCT/EP2017/051520.

* cited by examiner

MODULE FOR A TECHNICAL FACILITY AND METHOD FOR CONTROLLING A TECHNICAL FACILITY

This application is a 371 National Phase of PCT Application No. PCT/EP2017/051520, filed on Jan. 25, 2017; and this application claims priority of Application No. DE 10 2016 201 077.8 filed in Germany on Jan. 26, 2016, and which is herein incorporated by reference in its entirety.

1. FIELD OF THE INVENTION

The present invention relates to technical facilities and their control. In particular, the present invention relates to modularly buildable process and production-related facilities.

2. PRIOR ART

In the process industry, in particular in chemistry, pharmacy and food production, the demanded product quantities are increasingly difficult to predict and vary regionally dependent in short-term intervals. In addition, product life-cycles are becoming shorter and shorter due to the global availability of alternatives.

However, conventional production facilities are often not designed for these fluctuating product quantities. Continuously operated facilities are usually optimized for a certain amount of product per unit of time and can only be operated effectively at this production rate. Ordinary facilities for batch operation are less efficient and require many unproductive times, such as cleaning times or changeover times.

When adding or modifying the system, it is usually necessary to reconfigure or reprogram the corresponding facility control. This is a complex process, which is often comparable in terms of time with the hardware modification. This is complicated by a potential insufficient documentation of the existing control software or outdated control hardware that does not sufficiently provide the functions required for the new hardware.

Recent developments in the process industry are concerned with modular facility concepts in which the facility is made up of individual prefabricated modules. Such concepts and their challenges are described in a survey "Modular facility design and automation by means of the $F^3$ project" by Dipl.-Ing. Sabine Mühlenkamp/Wolfgang Ernhofer, Oct. 5, 2012, described in "Process". Also in this publication, the control-related integration of the modules is considered as an open question.

Corresponding modular concepts are also applicable to other production processes, e.g. for the production of consumer goods, industrial products, etc.

In such modular concepts, each facility module provides its own process-related or production-related function as a service of a higher-level process management level (PFE). It thus takes up the position of a service provider. The service offered by the facility module can be requested from the process management level, which is thus a service user. The integration of several facility modules and their services into a complete facility is called PFE engineering.

It is therefore the problem of the present invention to improve modules of a technical facility with regard to their control-related integration and thus to facilitate the overall PFE engineering.

3. SUMMARY OF THE INVENTION

The above problem is solved by a module for a technical facility according to claim 1 and by a method for controlling a technical facility according to claim 15.

In particular, the above problem is solved by a module for a technical facility comprising a technical hardware for executing a technical sub-process, a controller for local control of the technical hardware wherein the controller is configured to control the technical hardware autonomously and an external interface of the controller wherein the external interface can receive a number of defined commands and wherein the external interface of the controller comprises a server and the server comprises a fixedly predetermined information structure with static information and dynamic information, wherein the static information describes the technical hardware and the controller and the controller writes the dynamic information as real-time values of the technical hardware into the information structure.

A technical facility can be made up of several of these modules. In case more production capacity is desired, modules can be added to the facility in a simple way and then execute certain sub-processes. Since the controller of the respective module controls the technical hardware locally and autonomously and can bring it, for example, without control from the outside in certain defined states, the control effort of the entire system is minimized. The controller of the module can thus already be provided, programmed and configured by the module manufacturer, such that the facility manufacturer can create the control of the overall system with very little effort. Thereby, each module can offer one or more technical services that can be integrated into the overall system during PFE engineering and then used.

Because the external interface of the controller comprises a server, the module can be communicated in a simple and uniform manner. In particular, individual information can thus be queried purposefully by the module, wherein information of no interest is not transmitted. In particular, the server has for this purpose a fixedly predetermined information structure containing static and dynamic information regarding the technical hardware of the module. Therefore, targeted queries for information of interest may be directed to the module. In this case, the static information describes the technical hardware and the controller so that all information needed for the PFE engineering is provided. This information may include, for example, a detailed description of the services offered by the module, a description of the available states, and the control-related behavior of the module, a description of the available commands and their syntax and a description of the readable state information and measurement values.

In addition, the information structure available on the also includes dynamic information as real-time values of the technical hardware and therefore offers the possibility of communication with the module during operation. These real-time values of the technical hardware are written by the controller into the information structure on the server. As a result, dynamically changing real-time values can also be queried easily and purposefully from extern during operation, for example by controlling the higher-ranked process management level.

Due to the static and dynamic information available on the server, the module provides a complete module type package, which forms part of the management shell in industry 4.0 and includes all data and information for the virtual and professional representation of the module. In doing so, the controller will provide all data and information for PFE engineering as well as for ongoing operation on the server.

In PFE engineering, the modules are integrated into the PFE by reading the MTPs of the modules into the PFE and generating the necessary components on the PFE side for each required module. This includes both the interface to the information model of the module and the graphical representation of the module. Additionally, the inter-module procedure is configured in the PFE. Furthermore, a procedure control is created for the timely retrieval and monitoring (orchestration) of the module services. The control of the services of the modules is parameterized and, if necessary, an inter-module locking logic is generated. Finally, the physical communication in the network engineering is mapped and parameterized.

Preferably, the controller generates the real-time values from control data and/or measurement data of the technical hardware. Thus, control data and/or measurement data, for example measured values, control parameters or default values, etc. of the technical hardware are made available for retrieval and for communication, respectively.

Preferably, the controller generates the real-time values from states of the service provided by the technical hardware. Thus, the states of the technical hardware, such as "in operation", "stopped", "in maintenance", "defective", "heating up", or the order schedule, the occupancy times, the maintenance plan, etc. of the technical hardware can be provided for retrieval and for communication, respectively.

Preferably, the controller generates the real-time values from historical values of control data and/or measurement data of the technical hardware and/or communication data. This can be used to provide real-time values for retrieval and communication, respectively, that take into account the past or history or are calculated from historical values. For example, the next maintenance date of the technical hardware could be dynamically calculated and provided by the controller based on current load and past runtimes at different load levels or the number of critical states of the technical hardware. Control data may also be states of services provided by the technical hardware.

Preferably, historical values may be data such as threshold crossings, peak values, temperature traces. Historical values can furthermore preferably be provided with a time stamp.

Preferably, the controller generates the real-time values by extrapolation of control data and/or measurement data of the technical hardware and/or communication data. The controller can furthermore calculate and provide real-time values extrapolated into the future. For example, the controller may calculate and provide temperature traces, necessary maintenance or pause times at current load, necessary future cool down periods, idle time slots, possible maximum speed limits, etc. For extrapolation, the controller can use different models.

The information structure of the server preferably comprises a number of objects, each with at least one real-time value and a description of the real-time value. The real-time values are stored in objects of the server so that they can easily be retrieved, identified or referenced.

Preferably, the description in the object is a standardized meta-information for the real-time value. This allows an external device to query the presence of the real-time value via the external interface.

The real-time value of the object preferably comprises a time stamp. This allows multiple real-time values to be synchronized with each other, and the course of real-time values over time can be easily analyzed or displayed.

Preferably, the control of the technical hardware is done by means of the at least one service, which is provided by the controller and the controlled technical hardware, wherein the at least one service is mapped into the information structure on the server.

The objects of the information structure of the server preferably form a module type package containing all information necessary for integrating the module into a technical facility. The controller of the module thus provides all information in its external interface comprising the server for the module to be identified in the PFE engineering phase, information-related integrated into the overall system and parameterized. Furthermore, the module type package (MTP) also provides the dynamic information necessary or advantageous for communication with other controllers.

Preferably, the controller is configured such that the server is dynamically, in particular for each object individually queriable. Thus, from the outside, specifically only the information can be queried which is currently interested. Thus, information of no interest need not to be transmitted, which minimizes data transfer in the network or on the bus.

Preferably, the controller continuously updates the real-time values of the server. As a result, the information in the module type package is kept up-to-date.

Preferably, the external interface is furthermore configured to output information to upstream or downstream or parallel modules or to receive from them. The module can communicate directly with other modules and exchange information, such as commands, with these modules. For example, a module might request an input product from an upstream module in the process.

Preferably, the external interface is furthermore configured to receive or output information from a higher-ranked facility controller. The module can also communicate with higher-ranked facility controllers and receive from it for example, commands or orders and output messages to it. However, it can also be preferred to omit a higher-ranked facility control. In doing so, the modules communicate with each other as described above.

The technical hardware is preferably configured to generate an output product from an input product, and the technical hardware is furthermore configured to modify the input product to produce the output product, by changing a chemical composition, and/or changing at least one physical property, and/or adding material, and/or removing material. The technical hardware preferably has an input product and an output product and changes the input product such that an output product is produced. A product is defined by the fact that it can be changed by the technical hardware by means of at least one of the four mentioned methods. By changing the input product to the output product by means of the technical hardware, an added value is achieved. Therefore, the entire process has at least one technical hardware of this kind, which generates added value. The technical hardware preferably has an actuator which acts on the input product.

The server is preferably an OPC-UA server.

A technical facility preferably comprises several of the modules described above.

The above problem is also solved by a method for controlling a technical facility, wherein the facility is composed of several modules, each having a technical hardware for executing a technical sub-process, as well as a controller for local control of the technical hardware and an external interface of the control, wherein the external interface comprises a server having a fixedly predetermined information structure with static information and dynamic information, wherein the static information describes the technical hardware and the controller and the method comprises the following steps:
  a. writing the dynamic information into the information structure as real-time values of the technical hardware by the controller; and b. providing the dynamic information in the information structure of the server.

Thus, the advantages outlined above for the module are also achieved; in particular, this creates a possibility of making dynamically changing real-time values easily purposefully retrievable from extern during operation, for example by a controller of a higher-ranked process management level or by other modules.

Due to the static and dynamic information available on the server, the method provides a complete module type package, which forms part of the management shell in industry 4.0 and includes all data and information for the virtual and professional representation of a module. Thereby, the controller provides all data and information for PFE engineering as well as for ongoing operation on the server.

Preferably, the method further comprises at least one or more of the following steps:

c. generating the real-time values from control data and/or measurement data of the technical hardware by the controller;
d. generating the real-time values from states of the service provided by the technical hardware by the controller;
e. generating the real-time values from historical values of control data and/or measurement data of the technical hardware and/or communication data;
f. generating the real-time values by extrapolation based on control data and/or measurement data of the technical hardware and/or communication data.

Thus, the controller calculates and provides real-time values based on control data, measurement data, states of the service provided by the technical hardware, historical values thereof, and/or extrapolation. Accordingly, the controller can provide real-time values of the module based on the present, past and future of the module. In particular, the controller can thus provide in a module type package (MTP) in particular the dynamic information that is necessary or advantageous for communication with other controllers.

Further preferred embodiments of the invention will become apparent from the dependent claims.

4. BRIEF DESCRIPTION OF THE DRAWINGS

Figure 2:
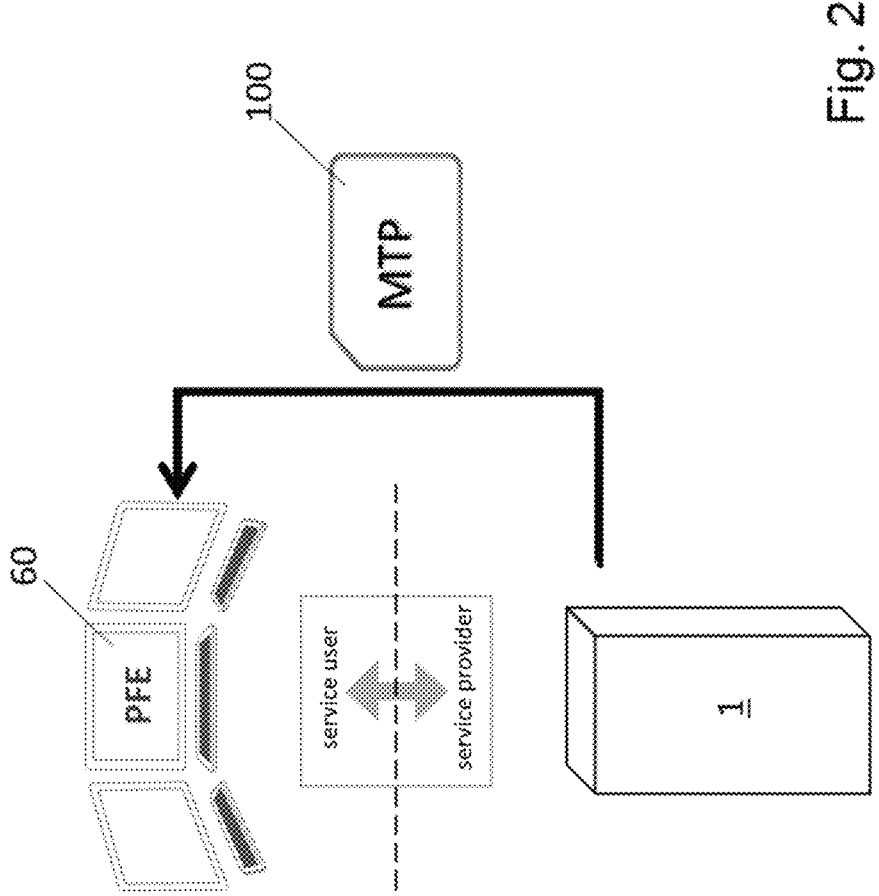
Figure 3:
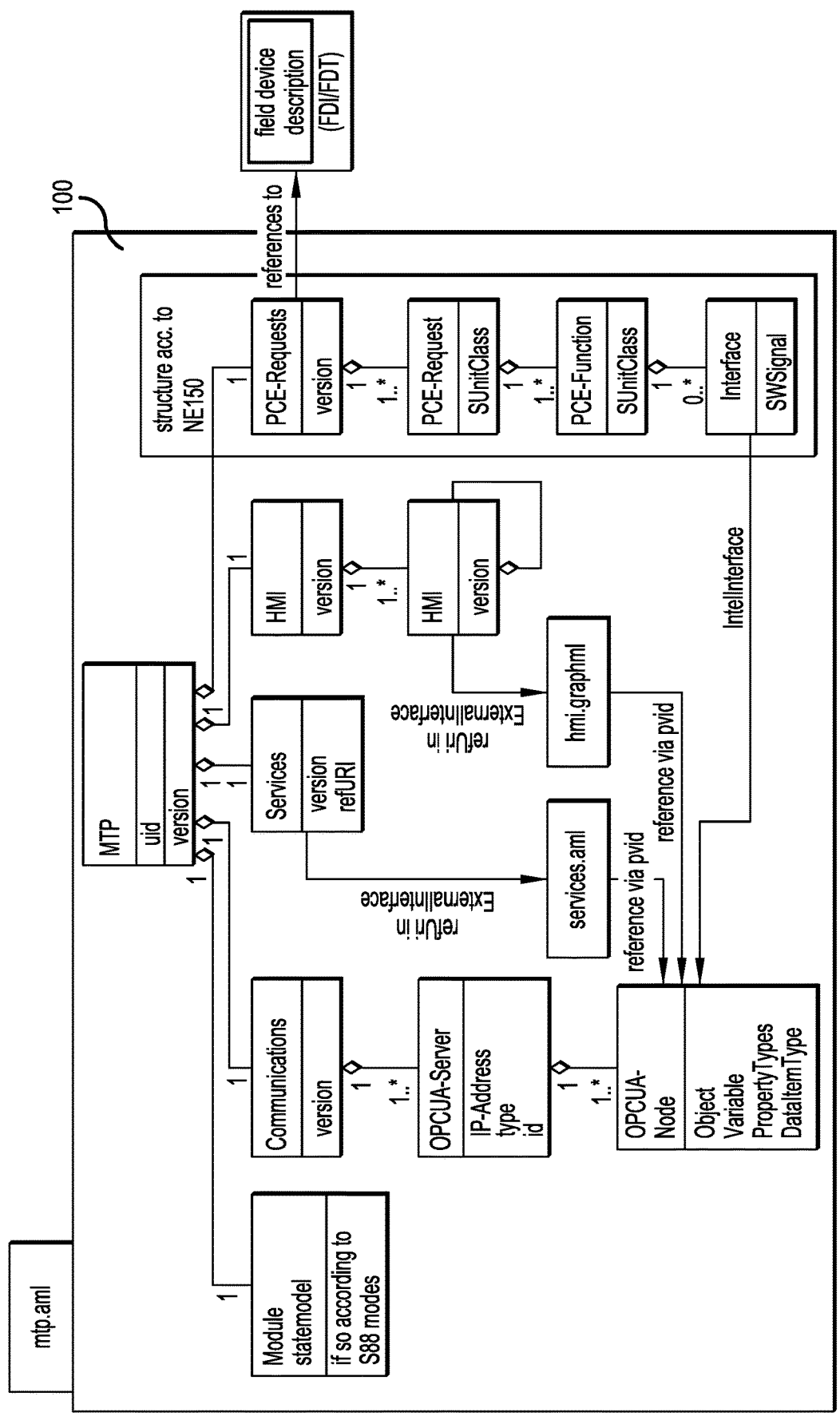
Figure 4:
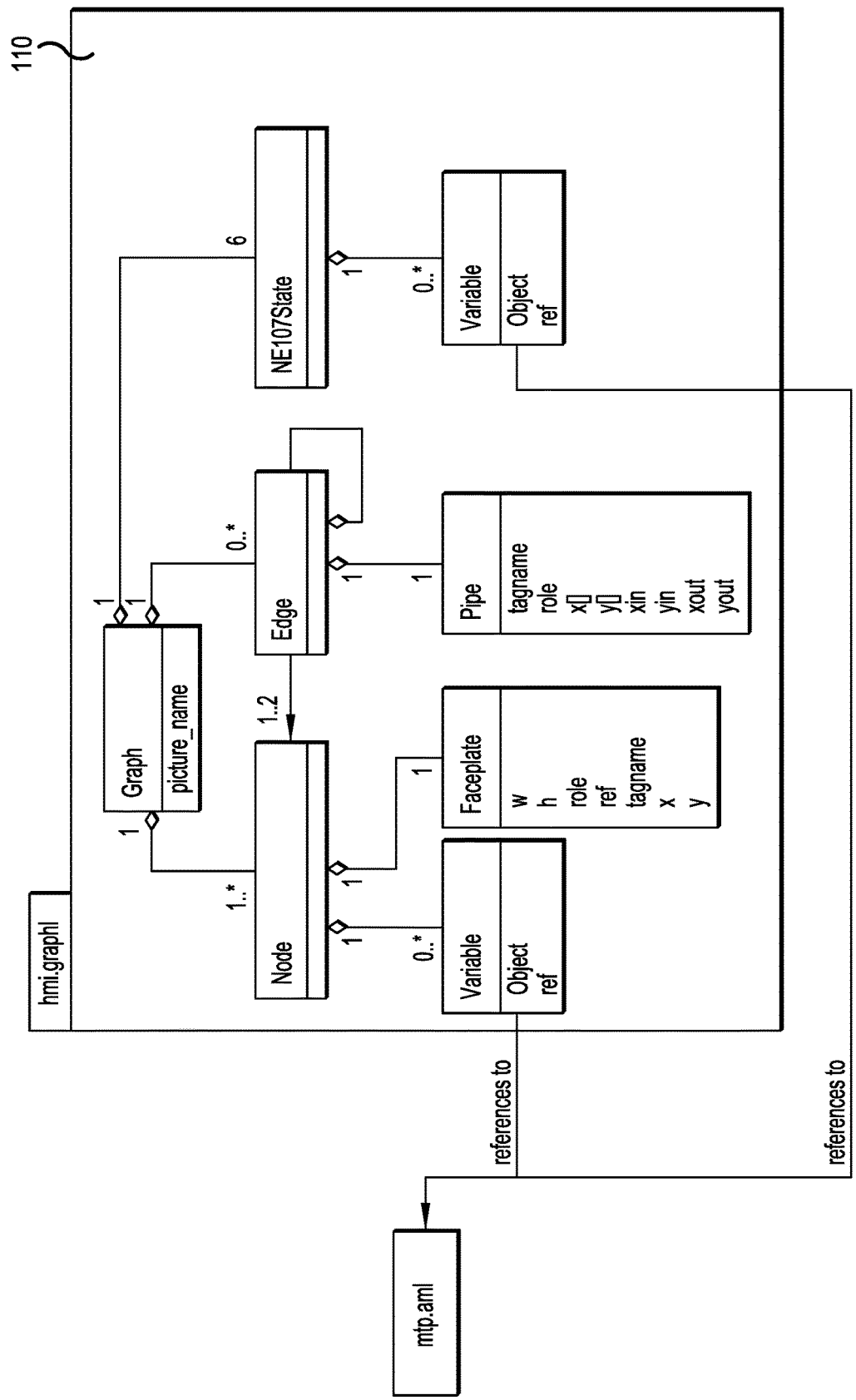
Figure 5:
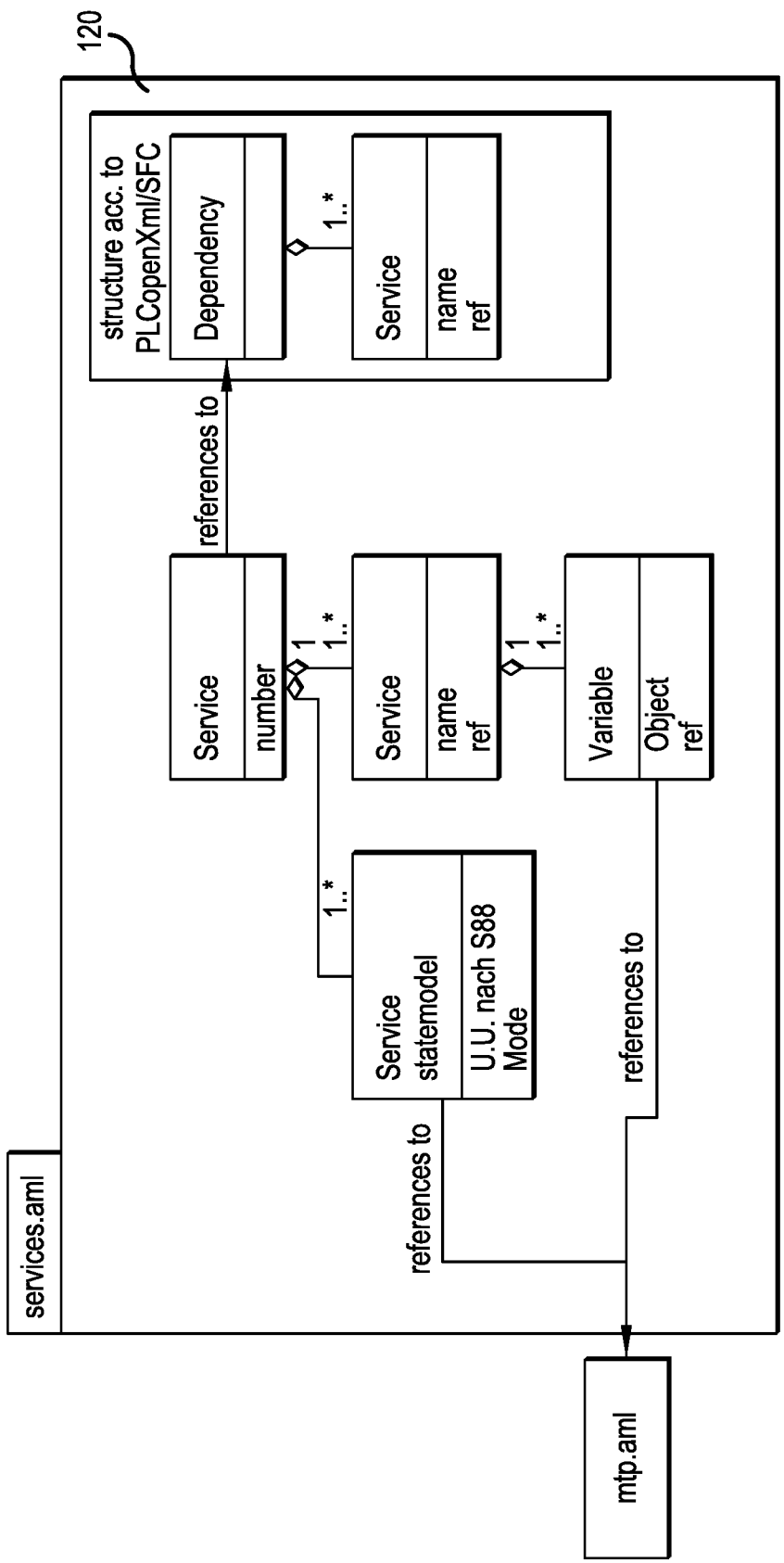

In the following, preferred embodiments of the present invention will be described by means of the drawings, in which shows:

FIG. 1 a schematic view of a technical facility with several modules and a higher-ranked facility control;

FIG. 2 a diagram showing the communication between a module of a technical facility and a process management level;

FIG. 3 a diagram illustrating an example architecture of a module type package manifest;

FIG. 4 a diagram illustrating an exemplary architecture of an operating screen description; and FIG. 5 a diagram illustrating an example architecture of an object "service".

5. DESCRIPTION OF PREFERRED EMBODIMENTS

In the following, preferred embodiments of the present invention will be described in detail with reference to the drawings.

FIG. 1 shows a technical facility 90 which is constructed from a plurality of individual modules 1, 70, 80 and possibly further modules (not shown). The technical facility 90 furthermore comprises a process management level (PFE) 60, which is formed, for example, by a higher-ranked controller 60, which communicates with the individual modules 1, 70, 80 via a suitable bus 62.

The module 1 of the technical facility 90 exemplifies all modules 1, 70, 80 of the technical facility 90. It comprises a technical hardware 10 for executing a technical sub-process, for example for the chemical industry. However, the technical facility can also affect other technical manufacturing processes, for example, the manufacture and assembly of products, packaging technology, logistics, etc.

The technical hardware 10 of the module 1 is preferably configured to produce an output product 140 from an input product 130. For this purpose, the technical hardware 10 is furthermore configured to change the input product 130 in order to produce the output product 140. This can be done by changing a chemical composition, as it is common, for example, in reactors in the chemical industry. This can also be done by changing at least one physical property, such as for example temperature, density, entropy, etc. Furthermore, the production of an output product 140 can be executed by adding material, for example, when mounting, soldering, printing or 3D printing. Finally, the production can also be executed by removing material, as it is the case, for example, during drilling, milling, etching, etc.

By changing the input product 130 to the output product 140 by means of the technical hardware 10, an added value is achieved. Therefore, the overall process comprises at least one technical hardware 10 of this kind, which generates an added value. The technical hardware preferably comprises at least one actuator in the broadest sense, which acts on the input product 130, for example a steamer.

In the illustrated process-related example, the technical hardware 10 comprises an actuator in the form of a reactor 30, which has a stirring device 40 which is driven by an electric motor 42. Furthermore, the reactor 30 comprises an electric heating rod 50, which is controlled by a power electronics 52. The reactor 30 itself is preferably one closed vessel to which an inlet pipe 32 and an outlet pipe 34 is connected to fill or empty it. The inlet pipe 32 extends to the outer boundary of the exemplary module 1 and ends there in an inlet flange 36. Through the inlet flange 36 and the inlet pipe 32, an input product 130 can be supplied to the reactor 30. Likewise, the outlet pipe 34 extends to the system boundary of the module 1 and ends there in an outlet flange 38. Through the outlet flange 38 and the outlet pipe 34, an output product can be removed from reactor 30. The module 1 is connectable to an upstream module 70 via the inlet flange 36 and connectable to a downstream module 80 via the outlet flange 38. Of course, other technical interconnection options, such as multiple inlets or multiple outlets or parallel switching of modules 1, 70, 80 is also possible.

The module 1 furthermore comprises a controller 20 for the local control of its technical hardware 10. The controller 20 is configured such that it can control the technical hardware 10, so here for example the electric motor 42 of the stirring device 40 and the power electronics 52 of the heating rod 50 autonomously. Thus, the controller 20, for example, is able to bring the module 1 technically into a defined state. The module 1 can comprise a number of well-defined technical states and can autonomously switch between these states on command. This allows the module, for example, to execute a technical sub-process independently without external influence.

The module 1 can furthermore comprise, for example, sensors, such as flow, pressure, or temperature sensors, or electrically operated valves or like elements (not shown). Such sensors or actuators are also connected to the controller 20 and can be queried or controlled by the controller 20.

The controller 20 comprises for this purpose I/O modules 24, 26, with which the controller 20 can control actuators such as the electric motor 42 of the stirring device 40 and the power electronics 52 of the heating rod 50, respectively. Further I/O modules for any sensors or further actuators are available if these are required for the technical function of module 1.

The modules 70 and 80 and further modules can be constructed similar to module 1, wherein they also comprise a controller similar to the controller 20, which can control the technical hardware of each module locally and autonomously and can bring each module in a number of certain defined states. Accordingly, the modules 1, 70, 80 are control-related autonomously in itself, such that technical hardware and controller together form a flexible usable module for a technical facility 90, which can be composed technically and control-related by "plug and play" to a total system 90.

The overall system 90 comprises a process management level 60 comprising a higher-ranked controller 60, which is connected control-related to the individual modules 1, 70, 80 via a bus 62. The higher-ranked controller only needs to send precisely defined commands to the individual modules 1, 70, 80, such that they take up one of their predetermined, defined states. In this case, the higher-ranked controller 60 does not need to know the control details or the individual elements of the technical hardware 10 of the respective module 1, 70, 80, nor control these individual elements. On the contrary, the higher-ranked controller 60 should preferably send only "high level" commands to the individual modules 1, 70, 80, such that they then autonomously take up the respective states in order to execute their technical sub-process. This control concept simplifies the planning, configuration and construction of technical facilities 90. In addition to its technical hardware 10, the module 1 brings along its complete control in a modular manner, such that the higher-ranked control effort is minimized.

For communication of the controller 20 of the module 1 with the higher-ranked controller 60 or the other modules 70, 80 via the bus 62, the controller 20 comprises an external interface 22. The external interface 22 comprises a server 28 for communication with the process management level 60 and the other modules 70, 80 of the facility 90. The server 28 is preferably an OPC-UA server 28. The OPC-UA server 28 comprises for this purpose a fixedly predetermined information structure which comprises static information and dynamic information. The static information describes the technical hardware 10 and the controller 20, such that in PFE engineering, the module 1 can be identified as a suitable service provider and can be integrated accordingly control-related and also in reality into the overall facility 90. The static information can include, for example, descriptions of the services offered by module 1, specifications of the input products, specifications of the output products, information on production auxiliary means, such as electricity, water, etc., user documentation, interface definitions with a corresponding description of the syntax of the commands, information for direct reception of the communication from the process management level to the module 1, a graphic representation of the module 1, etc.

In addition to the static information, the information structure of the OPC-UA server 28 also includes dynamic information regarding the module 1, which can change with time. Thus, module 1 can communicate via the OPC-UA server 28 with other facility components, in particular with the process management level 60, also during operation and provide and exchange, respectively, dynamic information. The dynamic information is written by the controller 20 as real-time values of the technical hardware 10 into the information structure of the OPC-UA server.

By means of the static and dynamic information available on the OPC-UA server 28, the module 1 can provide a complete module type package (MTP) 100 that forms part of the management shell in industry 4.0 and that includes all data and information for virtual and professional representation of a module. This provision of an MTP 100 of a module 1 as a service provider to the process management level (PFE) 60 as service user is exemplarily illustrated in FIG. 2.

The MTP 100 can furthermore include the information used for orchestration, i.e. the querying and monitoring of the services of the module 1. FIG. 3 shows a diagram illustrating an example architecture of a module type package 100 manifest. This manifest contains the data and information for the virtual & professional representation of module 1. The MTP 100 is mapped into the information model of the OPC-UA server 28.

The manifest can also contain, in addition to the version ("MTP/version"), manufacturer information and a unique MTP-ID ("MTP/uid"), links to the description files of the following aspects:

For example, the manifest includes a link to the state model of the module and all services ("modules state-model"), respectively: Each module 1 implements at least one service. It thus performs at least one function. The PFE 60 should be informed about the current state of the function in order to prevent unwanted overlaps in the process flow, for example, simultaneous heating and cooling of the same container.

For example, the manifest furthermore includes a link to the description of the external interface 22 of the module 1 ("Communications"): The module 1 is queried by the PFE 60 via the module's own external interface 22. For example, for the OPC-UA server 28 integrated into the external interface 22, the URL and the IP address are necessary ("OPCUA server"). This information must be present in the manifest, wherein integration-dependent parameters, such as for example the IP address, can be added later during the PFE engineering or can change dynamically.

For example, the manifest furthermore includes a link to all services that the module provides to the PFE ("Services"). Usually, modules 1 can implement several functions, e.g. stirring and tempering, as separate services. These can be integrated into the higher-ranked process controller by means of the PFE 60. An example of the structure of a service is shown in the object "services.aml" 120 that is illustrated in FIG. 5. The control of the technical hardware 10 can take place by means of one or more of such services. The service (s) are provided by the controller 20 and by the technical hardware 10 and are mapped into the information structure on the OPC-UA server 28.

For example, the manifest furthermore includes a link to the description of the user interface ("HMI"). The operation screen hierarchy within the module and references to the operation panel descriptions must be communicated to the PFE 60. Therefore, references to the associated descriptions are provided from the manifest. PLT position information (PCE-Request) If the internal PLT-positions of the module are to be announced to the PFE, a link to the corresponding description file in the manifest has to be available. The features of the aspects Services and user interface each refer to one and more files, respectively, inside the folder structure of the MTP. Each service has its own state model. For the description of dependencies between different services (e.g. simultaneous exclusion, sequences, etc.) a range "Dependency" is provided in the MTP, in which a behavioral description is formally mapped.

The aspect of the user interface is divided into the operation screen hierarchy and the operation screen description. The operation screen hierarchy ("Picture") is part of the MTP manifest. The individual operation screen descriptions themselves ("hmi.graphml") are stored in easily exchangeable files in the folder structure of the MTP. As a modeling language for the operation screens, which consist of nodes (objects)—for the process equipment, i.e. valves, pumps, etc.—and edges—for the mapping of pipelines and information flows—the format GraphML which is well supported by tools and libraries can be used.

The architecture of an operation screen description is shown in FIG. 4. Nodes correspond to the operation screen elements and comprise, in addition to their meaning, also position, size and variable information. Nodes can be connected by edges. An edge can thus be interpreted as a pipeline or information flow on the operation screen. In order to make diagnostic information of the module also accessible to the user, each operation screen also contains corresponding status displays, with links to the appropriate variables. Ultimately, the operation screen is displayed as a graph and is thus relatively easy to interpret during PFE engineering.

The controller 20 can generate the real-time values that are written into the information structure of the OPC-UA server 28 from control data and/or measurement data of the technical hardware 10. Thus, parameters, for example measured values, control parameters or default values, etc. of the technical hardware 10 are provided for querying and for communication, respectively. In the example of module 1, the real-time values could be, for example, the speed of the motor 42 or the current temperature of the reactor 30.

In addition, the controller 20 can generate the real-time values from states of the service provided by the technical hardware 10. Thus, the states of the technical hardware 10, such as for example "in operation", "stopped", "in maintenance", "defective", "heating up", or the order schedule, the occupancy times, the maintenance plan, etc. of the technical hardware 10 can be provided for querying and for communication, respectively. In the example of module 1, the real-time values could be for example the states "mixing" and "heating up" or the availability or non-availability of a particular service. For example, if the heating rod 50 needs to be replaced but the stirring device 40 is available during this time.

Furthermore, the controller 20 can also generate the real-time values from historical values of control data and/or measurement data of the technical hardware 10 and/or communication data. This can be used to provide real-time values for querying or communication that take into account the past or history or are calculated from historical values.

For example, the next maintenance date of the technical hardware 10 could be dynamically calculated and provided by the controller 60 based on current load and past runtimes at different load levels or the number of critical states of the technical hardware 10. For example, when the stirring device 40 can be driven by the motor 42 at different speeds and powers, the duration of the availability of module 1 may depend on the speeds and powers of past jobs. As the case may be, for cooling, the motor 42 has to be operated at a lower power or speed in the current job.

In addition, the controller 20 can generate the real-time values by extrapolation of parameters of the technical hardware 10 or of states of the service provided by the technical hardware 10. The controller can furthermore calculate and provide real-time values that are extrapolated into the future. For example, the controller can calculate and provide temperature courses, necessary maintenance or pause times at current load, necessary future cool down periods, idle time slots, potential limitations of a maximum speed, etc. For extrapolation, the controller 20 can use different models. Thus, the controller 20 can offer a service, for example, after completion of an order of the process management level 60, only with certain constraints. For example, when the engine 42 is still heated, stirring of a product in the reactor 30 only up to a certain power and up to a certain speed of the motor 42, respectively, or only for a limited period of time.

Each module type is developed once. This includes both the physical design of the process step to be realized here as well as the generation of the information-related interface to higher-ranked systems. Added to this is the engineering for the control logic and the operation screens. Ultimately, the engineering is carried out as in a small facility, with the difference that the module 1 has to be designed in its function generic for different types of use. In addition to the physical and information-related design of the module, in the end the MTP 100 has to be generated for integration into the PFE 60 and delivered together with the module 1.

In PFE engineering, the modules 1 are integrated into the PFE 60 by reading the MTPs 100 of the modules 1 into the PFE 60 and generating the necessary components on the PFE side for each required module 1. This includes the interface to the information model of the module 1 as well as the graphical representation of the module 1. In addition to that the inter-module method is configured in the PFE 60. The procedure control for the timely querying and monitoring (orchestration) of the module services is created. The control of the services of the modules 1 is parameterized and, if necessary, an inter-module locking logic is generated. Ultimately, the physical communication is mapped and parameterized in the network engineering.

Furthermore, the controller 20 can take over autonomously for the respective module 1 all security functions, reporting functions, protocol functions for the module 1, such that the higher-ranked controller 60 and process management level 60, respectively, is also relieved of this task. It is also possible to operate the module 1 manually by means of the controller 20 without a higher-ranked controller, e.g. if only very small quantities are to be produced and integration into a higher-ranked controller would not be worthwhile. For this purpose, the module 1 has its own user interface or control panel.

By means of the OPC-UA server 28, the module 1 can also output and provide, respectively, information, e.g. defined commands, to upstream or downstream or parallel modules. Thus, for example, the module 1 can inform the upstream module 70 to forward a pre-product to the module 1, if the module 1 is to process this. Likewise, the module 1 can issue a defined command to the downstream module 80 if it has completed processing and would like to forward the finished intermediate product for further processing to the module 130. Correspondingly, the modules 1, 70, 80 can realize a horizontal communication with each other, without a higher-ranked controller or PFE 60 necessarily being interposed.

Examples of defined states of the modules 1, 70, 80 are: "idle," "running", "halt", "stopped", "aborted" and "terminated". Furthermore, the state "running" can be subdivided into different operating modes, if this is possible for the sub-process. Thus, the sub-process can for example run with different parameters or with different gradients. Accordingly, correspondingly defined commands can be transmitted to the module 1 via the external interface 22 in order to instruct its controller 20 to approach the corresponding state. The transition between the individual states can then be controlled autonomously by the controller 20.

For communication with the OPC-UA servers 28 of the modules 1, 70, 80, the process management level 60 comprises an OPC-UA client 64. This can address appropriate queries to the OPC-UA server 28 and there retrieve or store information targeted. The process management level 60 furthermore comprises a module 66 for the actual process management and a module for a user interface (HMI) 68. In addition, the process management level 60 can execute further functions with further elements or modules 69.

LIST OF REFERENCE SIGNS

1 module
10 technical hardware
20 controller
22 external interface
24, 26 I/O module
28 server, OPC-UA server
30 reactor
32 inlet pipe
34 outlet pipe
36 inlet flange
38 outlet flange
40 stirring device
42 engine
50 heating rod
52 power electronics
60 process management level (PFE)/higher-level control
62 data bus
64 OPC-UA client
66 process control
68 user interface
69 further elements
70, 80 further modules
90 technical facility
100 module type package/MTP manifest
110 operating screen description
120 object "service.aml"
130 input product
140 output product

The invention claimed is:

1. A module for a technical facility comprising:
a technical hardware for executing a technical sub-process;
a controller for locally controlling the technical hardware, and
an external interface of the controller, wherein the external interface comprises a server, the server comprising a fixedly predetermined information structure with static information and dynamic information, the external interface configured to receive commands, related to a defined state of a plurality of states of the module, from a process level management controller, the plurality of states comprising at least two of idle, running, halt, stopped, aborted, or terminated,
wherein the static information describes the technical hardware and the controller,
wherein the controller writes the dynamic information as real-time values of the technical hardware into the information structure, and
wherein the controller is configured to control the security functions, reporting functions and protocol functions of the module, to control the technical hardware autonomously based on the defined state of the module, and to autonomously control a transition between the plurality of states.

2. The module according to claim 1, wherein the controller generates the real-time values from control data and/or measurement data of the technical hardware.

3. The module according to claim 1, wherein the controller generates the real-time values from states of the service provided by the technical hardware.

4. The module according to claim 1, wherein the controller generates the real-time values from historical values of control data and/or measurement data of the technical hardware and/or communication data.

5. The module according to claim 1, wherein the controller generates the real-time values by extrapolation based on control data and/or measurement data of the technical hardware and/or communication data.

6. The module according to claim 1, wherein the information structure of the server comprises a number of objects each having at least one real-time value and a description of the real-time value.

7. The module according to claim 6, wherein the description in the object is a standardized meta-information for the real-time value.

8. The module according to claim 6, wherein the real-time value of the object comprises a time stamp.

9. The module according to claim 1, wherein the control of the technical hardware is done via at least one service provided by the controller and by the controlled technical hardware, and
wherein the at least one service is mapped into the information structure in the server.

10. The module according to claim 6, wherein the objects of the information structure of the server form a module type package containing all information necessary to integrate the module into a technical facility.

11. The module according to claim 1, wherein the controller is configured such that the server is dynamically, in particular for each object individually queriable.

12. The module according to claim 1, wherein the controller continuously updates the real-time values of the server.

13. The module according to claim 1, wherein the external interface is furthermore configured to output or receive information to/from upstream or downstream or parallel modules.

14. The module according to claim 1, wherein the technical hardware is configured to produce an output product from an input product, and the technical hardware is furthermore configured to generate the output product in changing the input product by:
change of a chemical composition; and/or
change of at least one physical property; and/or
adding material; and/or
removal of material.

15. The module according to claim 1, wherein the server is an OPC-UA server.

16. A technical facility comprising a plurality of the modules according to claim 1.

17. A method for controlling a technical facility wherein the facility is constructed from a plurality of modules each having a technical hardware for executing a technical subprocess, and a controller for local, autonomous, control of the technical hardware, and an external interface of the controller, wherein the external interface comprises a server having a fixedly predetermined information structure with static information and dynamic information, wherein the static information describes the technical hardware and the controller and the method comprises:

writing the dynamic information into the information structure as real-time values of the technical hardware by the controller; and providing the dynamic information in the information structure of the server, wherein the external interface is configured to receive commands, related to a defined state of a plurality of states of the module, from a process management level controller, the plurality of states comprising at least two of idle, running, halt, stopped, aborted and terminated, and wherein the controller is configured to control the security functions, reporting functions, and protocol functions of the module, to control the technical hardware autonomously based on the defined state of the module, and to autonomously control a transition between the plurality of states.

18. The method according to claim 17, furthermore comprising:

generating the real-time values from control data and/or measurement data of the technical hardware by the controller;

generating the real-time values from states of the service provided by the technical hardware by the controller;

generating the real-time values from historical values of control data and/or measurement data of the technical hardware and/or communication data; and/or generating the real-time values by extrapolation based on control data and/or measurement data of the technical hardware and/or communication data.

19. A technical facility, comprising:

a process management level, comprising a higher-ranked controller; and a plurality of modules, each of said plurality modules comprising:

a technical hardware for executing a technical subprocess;

a controller for locally controlling the technical hardware; and an external interface of the controller, wherein the external interface comprises a server, the server comprising a fixedly predetermined information structure with static information and dynamic information, the external interface configured to receive commands, related to a defined state of a plurality of states of the plurality of modules, from a process management level controller, the plurality of states comprising at least two of idle, running, halt, stopped, aborted, and terminated, wherein the static information describes the technical hardware and the controller, wherein the controller writes the dynamic information as real-time values of the technical hardware into the information structure, wherein each of the plurality of modules is autonomously controlled with respect to the other modules of the plurality of modules, and wherein the controller is configured to control the security functions, reporting functions, and protocol functions of the plurality of modules, to control the technical hardware autonomously based on the defined state of the plurality of modules, and to autonomously control a transition between the plurality of states.

* * * * *